United States Patent
Hawkins et al.

(10) Patent No.: US 6,189,212 B1
(45) Date of Patent: Feb. 20, 2001

(54) METHOD FOR TUBE PLUG REMOVAL

(75) Inventors: Phillip J. Hawkins, Irwin; Joseph A. Divella, Jeanette, both of PA (US)

(73) Assignee: Westinghouse Electric Company LLC, Pittsburgh, PA (US)

( * ) Notice: Under 35 U.S.C. 154(b), the term of this patent shall be extended for 0 days.

(21) Appl. No.: 09/393,801

(22) Filed: Sep. 10, 1999

(51) Int. Cl.[7] .................................................. B23P 15/00
(52) U.S. Cl. ...................................... 29/890.031; 29/723
(58) Field of Search ...................... 29/723, 727, 890.031, 29/426; 138/89

(56) References Cited

U.S. PATENT DOCUMENTS

| | | |
|---|---|---|
| 2,275,310 | 3/1942 | Nuttal . |
| 2,411,246 | 11/1946 | Clapper . |
| 3,835,520 | 9/1974 | Sismore . |
| 4,307,983 | 12/1981 | Blough et al. . |
| 4,555,833 | 12/1985 | Hawkins et al. . |
| 4,734,972 | 4/1988 | Hawkins . |
| 4,746,158 | 5/1988 | Fields . |
| 4,800,637 | 1/1989 | Overbay . |
| 5,117,548 | 6/1992 | Griffith et al. . |
| 5,255,717 | 10/1993 | Nelson et al. . |
| 5,465,483 | 11/1995 | Fink et al. . |

*Primary Examiner*—I Cuba Rosenbaum

(57) ABSTRACT

A method for removing a plug from engagement with a nuclear reactor steam generator tube within a tube bundle, which plug has a shell, an expander, and a plug top, by providing a drill bit having a pilot portion and a drill portion, where the pilot portion diameter is smaller than the drill portion diameter. Further, removing a portion of the plug shell and expander using the drill bit and leaving the plug top in the tube. The plug top may be removed by providing a gripper tool, inserting the gripper tool into the tube, urging the gripper against the plug top and removing the plug top by removing the gripper from the tube.

11 Claims, 6 Drawing Sheets

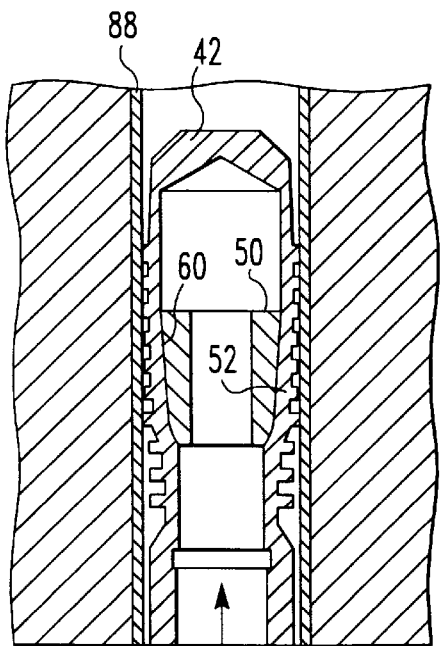
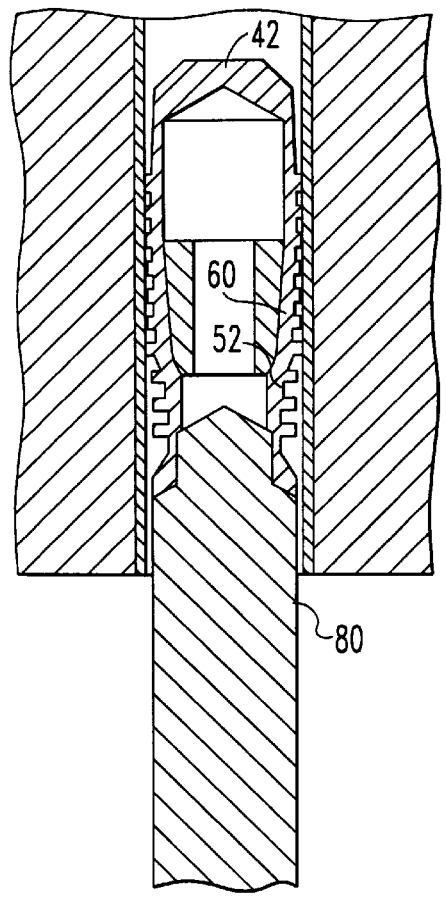
FIG.4
FIG.6

METHOD FOR TUBE PLUG REMOVAL

BACKGROUND OF THE INVENTION

1. Field of the Invention

This invention relates to a method for removal of plugs from tubes and more specifically to a method for removing plugs from a heat exchanger within a nuclear reactor steam generator.

2. Background Information

A heat exchanger within a pressurized water nuclear reactor steam generator consists of a vessel enclosing a plurality of tubes, through which water heated by the nuclear reaction flows. Secondary water in the vessel surrounds the outside of the tubes such that the heat exchange occurs between the two fluids. Water in the vessel is converted to steam which powers a turbine. Do to operating stresses, tubes can crack or fracture and, if not plugged, result in the commingling of the two fluids. Accordingly, tubes are regularly inspected and any tube that appears degraded is plugged so that the radioactive fluid does not contaminate the water used to generate steam.

A common device used to plug a heat exchange tube in a nuclear steam generator is a mechanical plug as shown in U.S. Pat. No. 4,390,042 to H. D. Kucherer et al. This type of plug comprises a cylindrical shell member closed at one end and having a tapered inner bore. An expander member is disposed within the cylindrical member such that when the expander member is drawn along the longitudinal axis of the cylindrical member, the outer surface of the cylindrical member is forced into contact with the inner surface of the heat exchange tube due to the taper of the inner bore of the cylindrical shell. When installed, the plug presses against the tube with a pressure of more than 10,000 p.s.i. As such, when removal of the plug is required, simply pulling the plug from the tube is not practical.

The heat exchanger of a nuclear steam generator contains a plurality of heat exchange tubes so that the generator may operate with some plugged tubes. However, during scheduled maintenance repair of certain tubes can be effected. The plug must be removed so that the tube may be repaired and returned to service. Alternatively, some tubes will simply be returned to service. However, prior to returning the tube to service, the plug must be removed. Because the force required to simply pull the plug from the tube could damage the tube, there are several methods of reducing the pressure applied by the plug prior to plug removal. For example, as disclosed in U.S. Pat. No. 4,800,637 to Overbay, the plug may be stretched by a mechanical means to attempt to reduce its diameter and, therefore, reduce the pressure exerted by the plug on the tube. The mechanical means disclosed is a threaded rod which, when inserted into the plug, contacts the closed end of the plug where pressure is applied causing the plug to stretch. Once the plug is stretched sufficiently, the plug is pulled from the tube. This method is inefficient as both pushing and pulling forces are involved. Additionally, plugs will often break prior to being stretched sufficiently to be withdrawn, leaving a portion of the plug wedged in the tube.

In U.S. Pat. No. 5,255,717, an apparatus has been disclosed which uses arc welding to create weld beads on the interior surface of a plug. The heating and contraction of the material to form the weld beads is intended to reduce the diameter of the plug so that less force is required to pull the plug from the heat exchange tube. Following the welding, the plug is pulled out by mechanical means. This method has proved to be time consuming and often does not result in a reduced plug diameter. Additionally, because the shell has been weakened, the plug will tear leaving a portion of the plug wedged in the heat exchange tube.

As disclosed in Hawkins, U.S. Pat. No. 4,734,972, another method of plug removal involves drilling a small hole through the top of the plug, tapping the hole, core drilling the plug shell, inserting a threaded rod into the tapped hole, and removing the plug top. This procedure is not time effective because of the necessity to use two drill bits.

Finally, there is a method whereby two drill bits are used to used to remove the shell. The first drill bit has a smaller diameter than the second drill bit. As with the device disclosed in Hawkins, U.S. Pat. No. 4,734,972, this procedure is not time effective because of the necessity of using two drill bits.

Accordingly, there is a need for a plug removal method which will ensure the removal of the entire plug without tearing.

There is a further need for a plug removal method which is time efficient.

There is a further need for a plug removal method which is compatible with plugs which are presently used in nuclear reactor steam generator heat exchange tubes.

SUMMARY OF THE INVENTION

This invention satisfies the above identified needs by providing a method of drilling the plug from the heat exchange tube in a single step by providing a drill which has a pilot portion and a drill portion. The pilot portion is sized to leave a predetermined plug shell thickness as the plug is being cut. If the pilot portion diameter is too big the bottom portion of the shell will break off, possibly wedging and damaging the tube surface as the bit is advanced. However, the pilot portion should also be large enough to effectively minimize the expander remnant so that it may be removed with the plug top. The drill bit further incorporates a drill section with a diameter slightly smaller than the heat exchange tube. As the drill bit is advanced into the plug the pilot portion of the drill initially reduces the shell thickness and the drill portion removes the remainder. The drill bit is advanced until it begins to impinge on the plug top. At that point, the drill bit is removed along with any portion of the expander which remains. Because the drill portion has removed the bulk of the plug shell, including that portion which the expander had forced into contact with the heat exchange tube wall, the plug top may be removed with little effort.

According to another aspect of the invention, a drilling machine is provided which is capable of supplying the rotational force to the drill bit. The drilling machine can be attached to the underside of a nuclear reactor steam generator tube bundle. The drill bit is positioned in the drilling machine such that, when the platform is attached to the tube bundle, the drill bit is aligned with the tube which is plugged.

BRIEF DESCRIPTION OF THE DRAWINGS

A full understanding of the invention can be gained from the following description of the preferred embodiment when read in conjunction with the accompanying drawings in which:

FIG. 4 is a schematic view of the drill bit below a plugged heat exchanger tube.

FIG. 6 is a schematic view of the drill bit partially inserted into a plug within a heat exchange tube.

DESCRIPTION OF THE PREFERRED EMBODIMENT

It is sometimes necessary to remove a plug from a heat exchange tube within the steam generator of a nuclear reactor. The invention described herein provides plug removal apparatus for effectively removing a tube plug from a heat exchange tube, and more particularly, provides a tube plug drill which can engage and remove all types of tube plugs.

Figure 1:
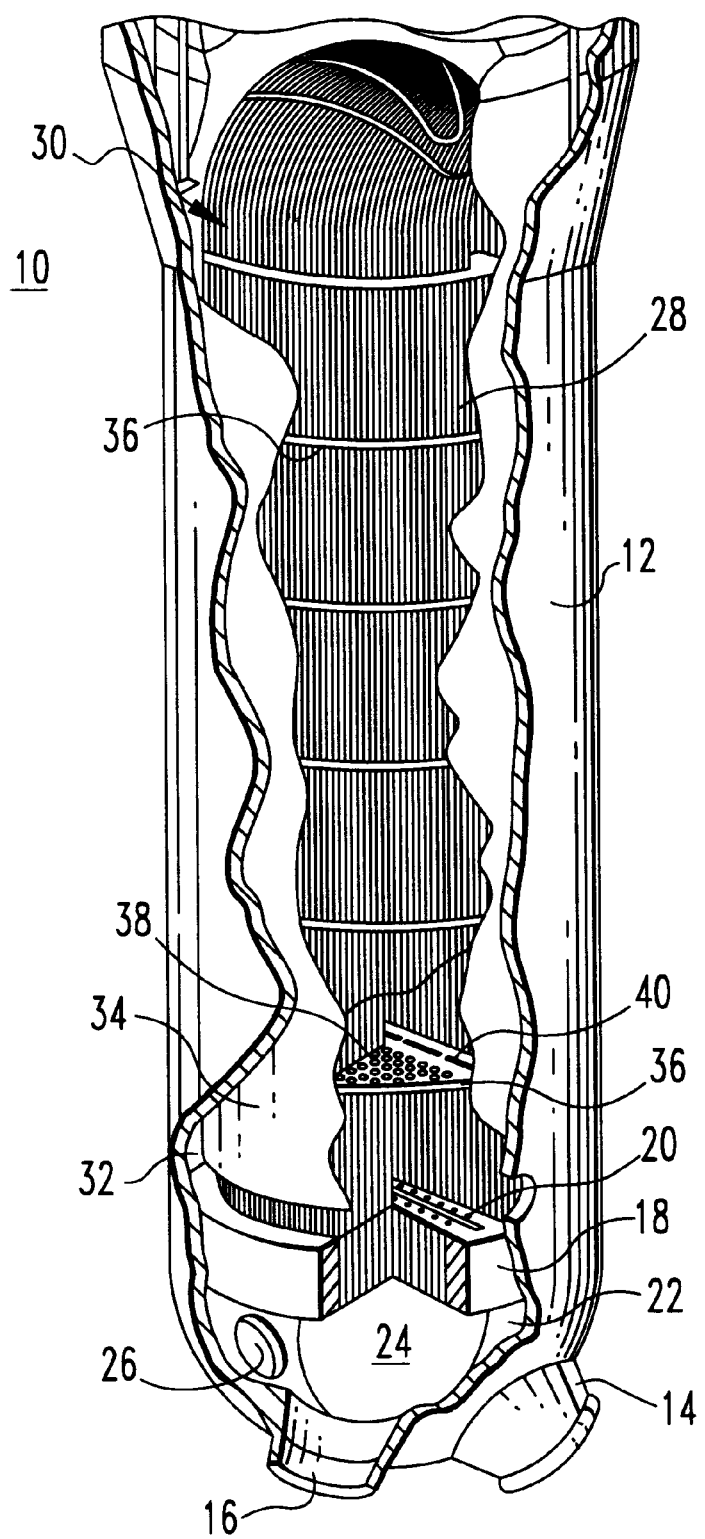
FIG. 1 is a partial cross-sectional view in elevation of a portion of a typical pressurized water nuclear reactor steam generator.

Referring to FIG. 1, a nuclear reactor steam generator 10 is comprised of an outer shell 12 with a primary fluid inlet nozzle 14 and a primary fluid outlet nozzle 16 attached near the lower end of the shell. A generally cylindrical tube sheet 18 having tube holes 20 therein is also attached to the outer shell 12 near its lower end defining therewith a channel head 22. A dividing plate 24 in the channel head 22 attached to both the tube sheet 18 and the outer shell 12 divides the channel head 22 into a primary fluid inlet plenum and a primary fluid outlet plenum, as is well understood in the art. Access to the channel head 22 is through one of two manways 26 (only one shown) provided in the shell 12.

Tubes 28 are heat transfer tubes with a U-curvature disposed within the outer shell 12 and attached to the tube sheet 18 through the tube holes 20. Tubes 28, which may number about 4000, form a tube bundle 30. In addition, a secondary fluid inlet nozzle (not shown) is disposed in the outer shell 12 above the top of the curvature in the tubes 28 for providing a secondary fluid, such a feedwater, which flows downwardly through an annular space 32 between the outer shell 12 and the inner wrapper 34, which does not extend completely to the tube sheet 18. The secondary fluid flows under the wrapper 34, contacts the tube sheet 18 and then upwardly against the tubes 28 of the bundle 30 where a portion of the water is converted to steam which exits the steam generator 10 through a steam outlet at the top thereof (not shown).

A plurality of axially spaced support plates or baffles 36 which, as illustrated, have holes 38 therein aligned with the holes 20 provided in tube sheet 18, thereby to provide lateral support to the individual tubes 28 in the tube bundle 30. Larger apertures or flow slots 40 are disposed in the support plates or baffles 36 to allow movement of the secondary fluid or feedwater as well as steam through the steam generator 10.

Due to the presence of various corrosive elements, temperature gradients encountered by the tubes 28, as well as mechanical vibration induced by the flow of the secondary fluid through the steam generator 10, the tubes 28 in the tube bundle 30 degrade with time. Since the primary fluid is radioactive due to its contact with the nuclear core, it is imperative to maintain a strict separation of the primary fluid from the secondary fluid to prevent contamination of the secondary fluid. In this respect, it becomes apparent that when individual tubes 28 in the tube bundle 30 become degraded, it is necessary to plug these tubes so as to prevent the flow of primary fluid therethrough.

Figure 2:
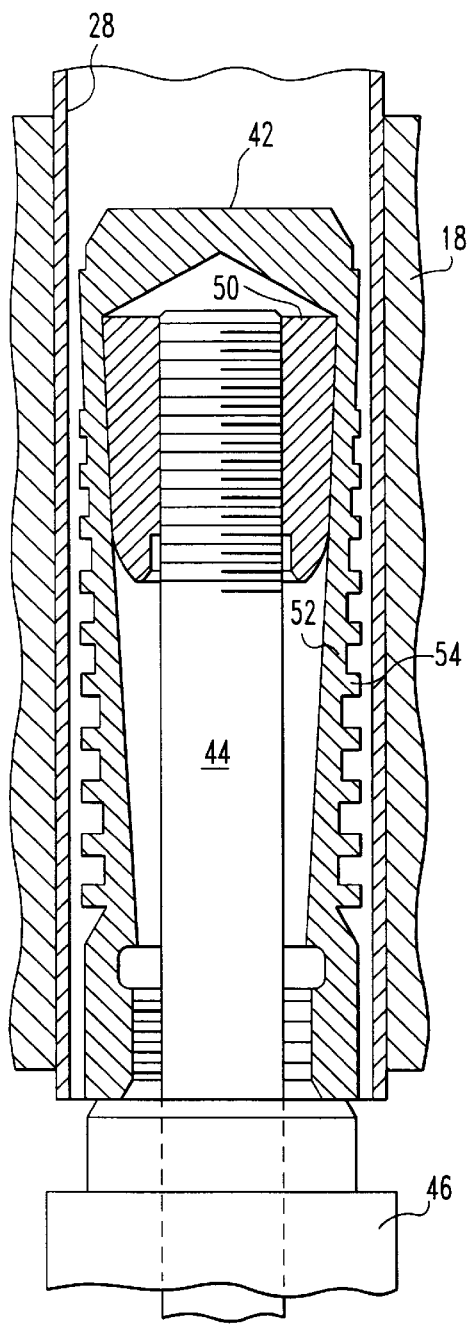
FIG. 2 is a cross-sectional view in elevation of a tube plug in the unexpanded condition within a heat exchange tube.
Figure 3:
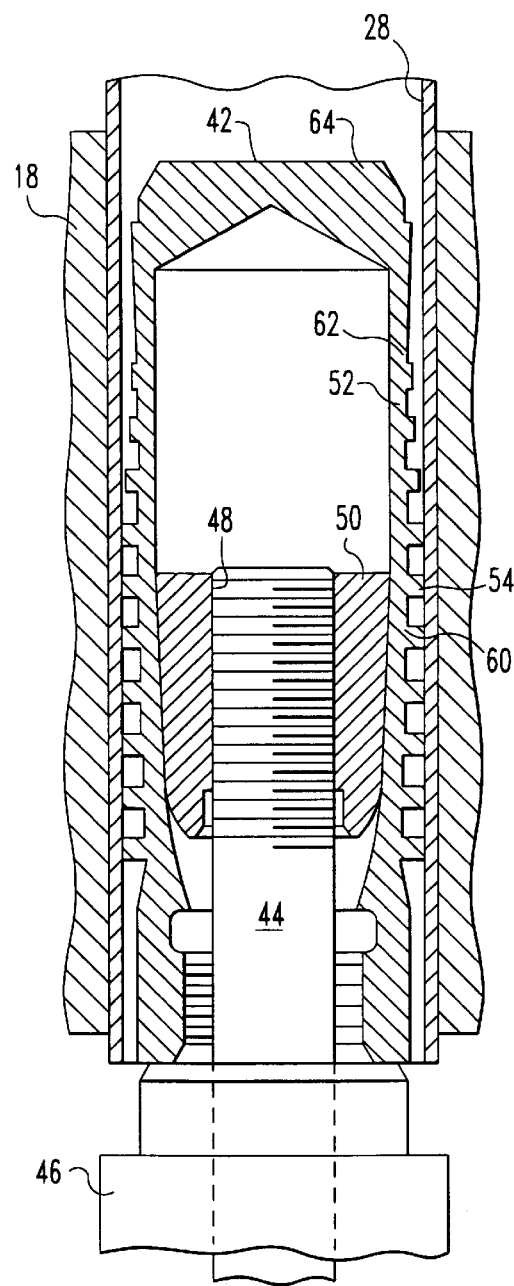
FIG. 3 is a cross-sectional view in elevation of the tube plug as expanded within a heat exchange tube.

Various plugs are available which have been successfully used in steam generators to plug the heat transfer tubes therein, such as the mechanical plug described in the aforementioned U.S. Pat. No. 4,390,042. FIG. 2 depicts such a plug 42 in the unexpanded state, positioned within the tube 28 at the tube sheet 18 and positioned on the drawbar 44 of a tube expanding device, a portion of which is shown as 46. FIG. 3 depicts the same plug 42 in the expanded condition after drawbar 44 has engaged the internal threads 48 of expander member 50 and tube plug expanding device 46 has pulled the expander member 50 relative to shell 52 of the plug, causing shell 52 to expand until lands 54 contact the heat exchange tube 28. Thus, after the draw bar 44 has been drawn down, there is a contacting portion 60 of plug 42 that is in contact with the tube 28, and a non-contacting portion 62 which includes the plug top 64. A typical material for making tube plugs is Iconel®. Iconel® is nominally 79.5% (by weight) nickel, 13% chromium, and 6.5% iron and has a hardness of 40 to 45 Rockwell "C." When installed as described above, the plug will contact the tube with pressure usually in excess of 50,000 p.s.i. Such plugs seal the tubes to remove them from operation, thereby preventing any contamination of the secondary fluid or feedwater by contact with the primary fluid. However, there are times when such plugs have to be removed. A preferred method of plug removal is by mechanically drilling the plug 42 from the associated tube 28 so as to free the tube for repair or reconstruction.

Figure 5:
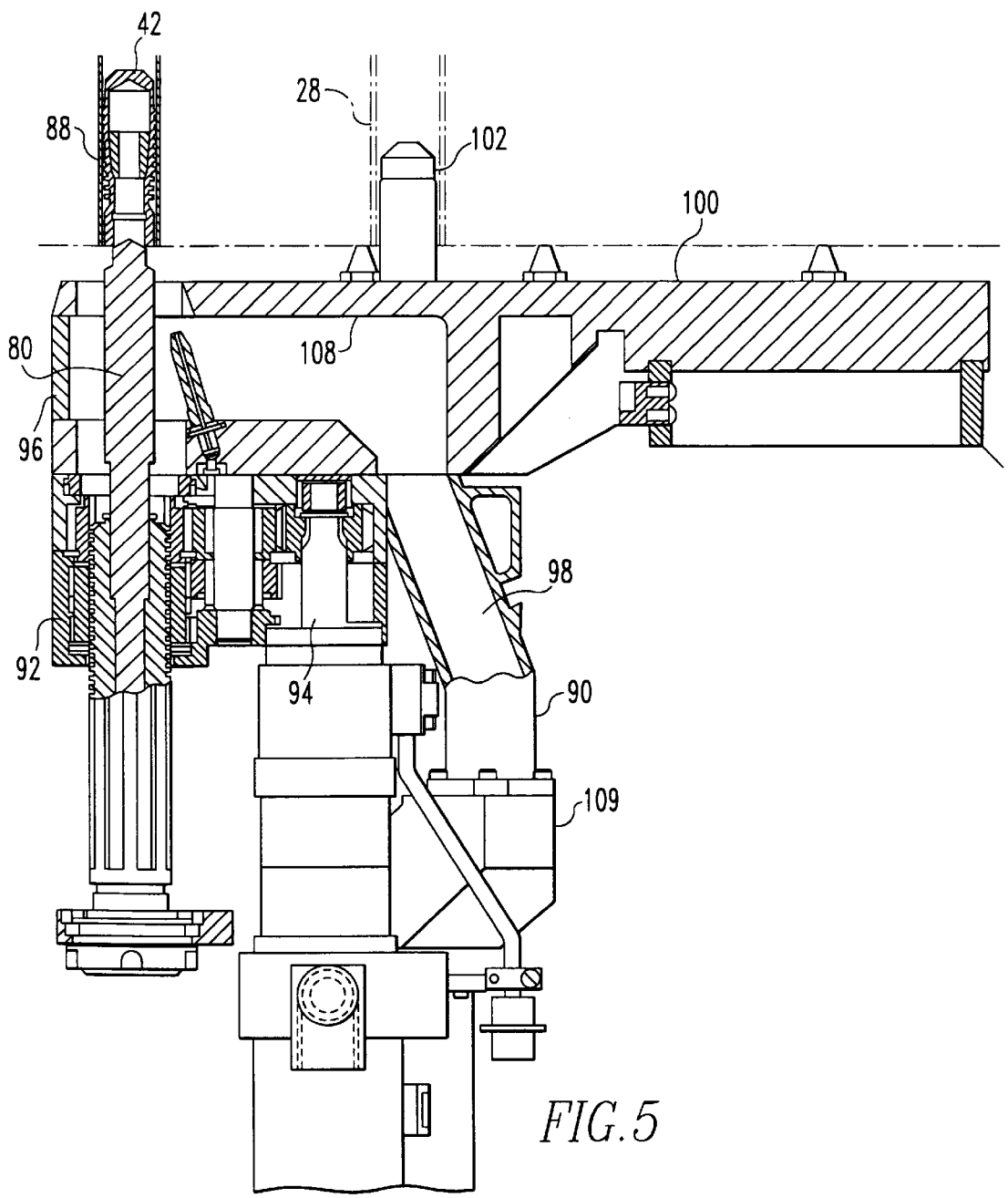
FIG. 5 is a partial cross-sectional view of a drilling machine.

FIG. 4 shows the tube plug removal drill bit 80 required to perform plug removal according to the present invention. The drill bit is made from a material, such as hardened steel, that is harder than Iconel®. Preferably the drill bit has a hardness of 62 Rockwell "C." As shown in FIG. 5, the drill bit 80 may be disposed within a drill machine 90 capable of providing a rotational force. The drill machine 90 has a motor 94 capable of providing a rotational force to the drill bit 80, and a advancing means 92 to move the drill bit 80, and a protective sleeve 96. Preferably, the machine 90 has a waste collection means 98, such as a housing 108 in communication with a vacuum 109, to collect portions of the plug shell 52 as it is being drilled (as described below). One preferred embodiment of drill machine 90 is suspended from the tube bundle 30 by a frame in the form of a generally rectangular flat or planar plate 100 which is attached by locking means such as camlocks 102 inserted into the ends of some of the tubes 28 within holes 20. A hand-held version of the machine 90 (not shown) does not require a frame for support but is otherwise the same as the embodiment depicted in FIG. 5.

In operation, the drill machine 90 is affixed to the tube bundle with the drill bit 80 positioned below the plugged heat exchange tube 88. The drill machine 90 incorporates a positive feed mechanism that advances the drill bit 80 at a speed that is proportional to its rotational speed. The drill machine applies a rotational force to the drill bit 80 and the drill bit 80 advances towards the plug 42 within the heat exchange tube 88 until the pilot portion 82 (described below) contacts the plug. Once initial contact between the drill bit 80 and the plug 42 has been made, the drill may properly cut and remove the contacting portion 60 of the plug 42. As the drill bit 80 is advanced, the plug shell 52 and the expander 50 are removed.

Figure 7:
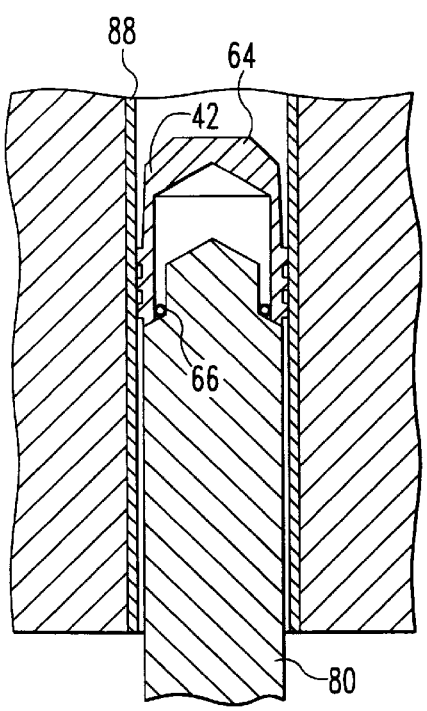
FIG. 7 is a schematic view showing the drill bit fully inserted into a plugged heat exchange tube.

As shown in FIG. 4, the drill bit 80 has a pilot portion 82 which has been sized to leave a predetermined plug shell 52 thickness. Below the pilot portion 82 is the drill body portion 84, which has a larger diameter than the pilot portion 82. If the pilot portion's 82 diameter is too large, the bottom portion of the plug shell 52 will break off wedging and possibly damaging the tube surface as the bit 80 is advanced. However, the pilot portion 82 is large enough to minimize the expander remnant 66 shown in FIG. 7. As shown in FIG. 6, after the pilot portion 82 has reduced the plug shell 52 by a predetermined amount, the drill body portion 84 removes the remaining portion of the plug shell 52. Once a sufficient portion of the expander 50 is removed, an expander remnant 66 will detach from the shell 52 and spin freely above the drill bit 80. As shown in FIG. 7, the drill bit 80 is advanced until substantially all of the contacting portion 60 of the plug 42 has been removed. The pilot portion 82 is also sized so that, near the top, unexpanded portion of plug 42, the pilot portion 82 no longer contacts the shell 52. At this point, the shell is removed solely by the drill body portion 84.

Figure 8:
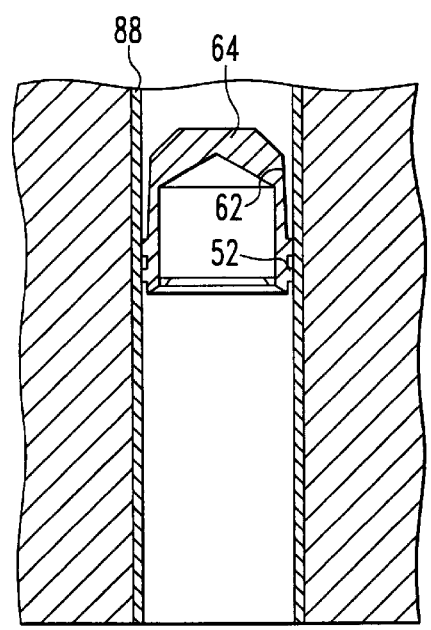
FIG. 8 is a schematic view showing the plug remnant and plug top.

At some point, which varies from plug to plug, enough of the contacting portion 60 of the plug 42 will be removed so that the frictional force holding the plug 42 in place within the tube 88 is less than the force of the drill bit 80 against the plug 42. At this point the drill bit 80 will begin to push the plug 42 into the tube 88. Once this occurs, the drilling operation is over and drill bit 80 is withdrawn from the plugged heat exchange tube 88. Typically, the expander remnant 66 will not fall out as the drill bit is removed. As shown in FIG. 8, after the drill bit 80 is removed from the plugged tube 88, only a small portion of the contacting portion 60 of the shell, as well as the non-contacting portion 62 of plug shell 52 and plug top 64, remain within the plugged tube 88.

Figures 9, 9A:
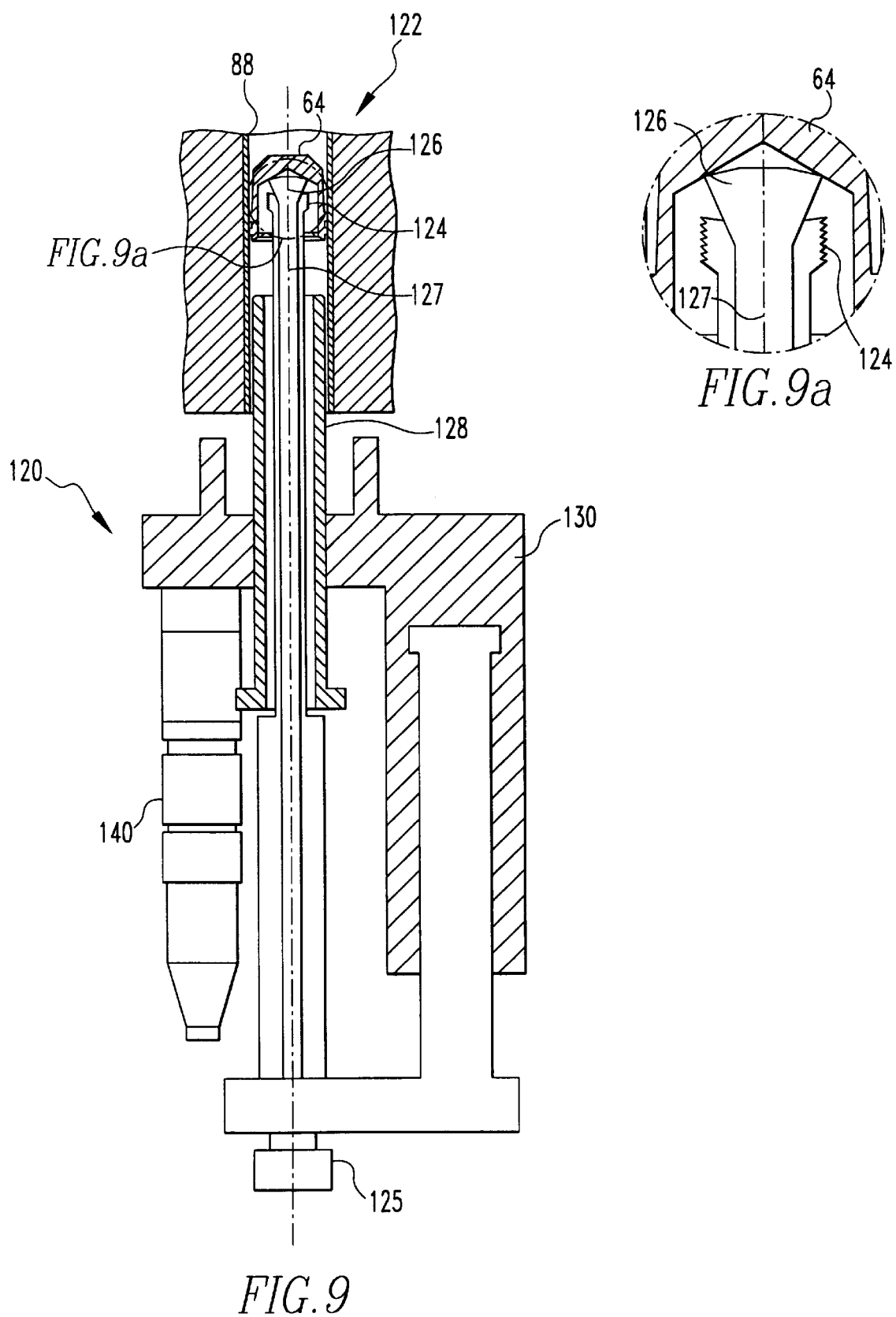
FIG. 9 is a schematic view of a plug top removal tool.

As shown in FIG. 9, after the drill bit 80 is removed, a gripper tool 120 is positioned below the plugged tube 88. The gripper tool 120 consists of a collet assembly 122 with a plurality of gripping surfaces 124 and a collet actuator 126, and a gripper guide 128. The gripper guide 128 is a hollow cylinder and a slidable disposed actuator shaft 127 passes therethrough. The actuator shaft 127 supports the actuator 126 and collet 124 and may be advanced or withdrawn using the actuator piston 125 located at the bottom of the gripper tool 120. The gripper tool 120 may be mounted on a frame 130 which may be attached to a robotics arm (not shown). The robotics arm will position the gripping tool 120 to align with the plugged tube.

Once the gripper tool 120 is positioned below the plugged tube 88, the guide 128, the actuator shaft 127, actuator 126, and collet 124 are inserted into the plugged tube. The guide 128 has a diameter that is slightly smaller than the plugged tube 88, and will align the collet assembly 122 with the plug top 64. The collet assembly 122 is extended until the collet 124 contacts the plug top 64. Once the collet 124 contacts the plug top 64, the actuator piston 125 draws the actuator shaft 126 down, urging the gripping surfaces 124 against the side of the plug top 64. The collet assembly 122 is then lowered drawing the plug top 64 down through tube 88 until the plug top 64 contacts the guide 128. The actuator shaft 126 is then moved upwards, releasing the gripping surfaces 124 from the plug top 64. At this point the plug top 64 is resting on the guide 128. The gripper 120 is then removed from the heat exchange tube 88 withdrawing the plug top 64 with it. A lighted inspection camera 140 can then be used to examine the end of tube 88 for acceptability.

While specific embodiments of the invention have been described in detail, it will be appreciated by those skilled in the art that various modifications and alternatives to those details could be developed in light of the overall teachings of the disclosure. For example, while the drilling apparatus has been described as being mounted on a platform, such an apparatus could be mounted on an end effector of a robotics arm. Accordingly, the particular arrangements disclosed are meant to be illustrative only and not limiting as the scope of the invention which is to be given the full breath of the claims appended and any and all equivalents thereof.

What is claimed is:

1. A method for removing a plug from engagement with a nuclear reactor steam generator tube within a tube bundle, which plug has a shell, an expander, and a plug top, comprising the steps of:

providing a drill bit having a pilot portion and a drill portion, said pilot portion diameter being smaller than said drill portion diameter and sized to leave a predetermined plug shell thickness so that said plug shell will not break off as said drill bit is advanced;

removing a portion of said shell and said expander using said pilot portion of said drill bit;

removing an additional portion of said shell and said expander using said drill portion; and removing said plug top.

2. The method of claim 1, wherein a portion of said expander is frictionally engaged with a portion of said tube shell, further comprising the step of: removing a said portion of said expander that is frictionally engaged to said shell.

3. The method as claimed in claim 1, wherein said plug shell has a portion contacting said tube, further comprising the steps of:

removing substantially all of said shell portion contacting said tube.

4. The method as claimed in claim 3, wherein said portion of said plug shell contacting said tube frictionally holds said plug in said tube, further comprising the steps of:

applying a force to advance said drill bit into said tube;

removing said shell portion contacting said tube until said force advancing said drill bit overcomes said friction and said plug is pushed into said tube.

5. The method as claimed in claim 4, wherein said plug shell has a portion not contacting said tube, said pilot portion sized to remove only said contacting portion of said shell and said expander, leaving said non-contacting portion to be removed by said drill portion of said drill bit.

6. The method as claimed in claim 5, further comprising the steps of:

providing a gripper tool;

inserting said gripper tool into said tube;

urging said gripper tool against said plug top;

removing said plug top by removing said gripper tool from said tube.

7. The method of claim 6, further comprising the steps of:

providing said gripper tool with a collet assembly having gripping surfaces and an actuator;

urging said gripping surfaces against said plug top by drawing said actuator into said collet assembly to expand said collet assembly.

8. The method of claim 7, further comprising the steps of:

providing said gripper tool with a hollow cylindrical guide;

providing said actuator with an actuator shaft, said actuator shaft slidable disposed within said guide and supporting said collet assembly;

inserting said guide into said tube;

sliding said shaft toward said plug top.

9. The method of claim 8, further comprising the steps of:

providing an inspection camera;

inspecting said tube for acceptability using said camera.

10. The method of claim 1, further comprising the steps of:

providing a drilling machine having a motor and an attaching means which can attach said drilling machine to said tube bundle and which is rotatably coupled with said drill bit attaching said drilling machine to said tube bundle adjacent to said plugged tube;

using said motor to rotate said drill bit.

11. The method of claim 10, further comprising the steps of:

providing said drilling machine with a means to advance said drill bit toward said tube;

advancing said drill bit into said tube.

* * * * *